United States Patent
Ribe

(10) Patent No.: US 6,257,799 B1
(45) Date of Patent: Jul. 10, 2001

(54) JOINING DEVICE FOR HAND-RAIL

(75) Inventor: Charles Ribe, Hirson (FR)

(73) Assignee: Au Creuset de la Thierache, Societe Anonyme, Origny-en-Thierache (FR)

( * ) Notice: Subject to any disclaimer, the term of this patent is extended or adjusted under 35 U.S.C. 154(b) by 0 days.

(21) Appl. No.: 09/095,080

(22) Filed: Jun. 10, 1998

(30) Foreign Application Priority Data

Jun. 11, 1997 (FR) .................................................. 97 07406

(51) Int. Cl.$^7$ ....................................................... F16B 7/18
(52) U.S. Cl. .............................. 403/402; 403/87; 256/65
(58) Field of Search ............................ 256/67, 60, 65; 403/401, 402, 65, 119, 53, 4, 84, 86, 87, 91, 99, 102, 103, 371, 374.1, 258, 260, 305; 285/185

(56) References Cited

U.S. PATENT DOCUMENTS

| 307,627 | * | 11/1884 | Brightman | 403/305 X |
|---|---|---|---|---|
| 695,022 | * | 3/1902 | Albertson | 403/86 X |
| 1,123,839 | * | 1/1915 | Bridges | 285/185 X |
| 2,255,262 | * | 9/1941 | MacFadden | 285/185 |
| 2,630,114 | * | 3/1953 | Hart | 403/103 X |
| 2,630,342 | * | 3/1953 | Gilmont . | |
| 2,816,769 | * | 12/1957 | Noble | 403/374.4 X |
| 2,854,261 | * | 9/1958 | Spaide . | |
| 2,999,671 | * | 9/1961 | Blayden . | |
| 3,233,871 | * | 2/1966 | Schroer . | |
| 3,767,236 | * | 10/1973 | Horgan, Jr. | 403/73 |
| 4,332,499 | * | 6/1982 | Stucheli | 403/53 |
| 4,603,526 | * | 8/1986 | Bollman | 403/86 X |
| 4,662,139 | * | 5/1987 | Bollman | 403/86 X |
| 4,737,047 | * | 4/1988 | Oshita | 403/260 X |
| 4,767,232 | * | 8/1988 | Francis | 403/91 X |
| 4,854,549 | * | 8/1989 | Roberts et al. | 256/69 X |
| 5,071,281 | * | 12/1991 | Murphy et al. | 403/295 X |
| 5,275,444 | * | 1/1994 | Wythoff | 285/185 X |
| 5,437,433 | * | 8/1995 | Rezek | 256/67 |
| 5,577,714 | * | 11/1996 | Venegas, Jr. | 256/65 |
| 5,584,469 | * | 12/1996 | Goodwin | 256/65 |
| 5,641,236 | * | 6/1997 | Hornung et al. | 403/171 X |
| 5,647,681 | * | 7/1997 | Chen | 403/270 X |

FOREIGN PATENT DOCUMENTS

| 429642 | * | 6/1926 | (DE) | 403/199 X |
|---|---|---|---|---|
| 2345764 | * | 6/1974 | (DE) | 256/62 X |
| 3123550 | * | 12/1982 | (DE) | 403/401 |
| 3511394 | * | 10/1986 | (DE) | 403/402 |
| 579070 | * | 1/1994 | (EP) | 256/61 X |

* cited by examiner

Primary Examiner—Harry C. Kim
(74) Attorney, Agent, or Firm—Harrison & Egbert

(57) ABSTRACT

A joining device for a handrail having at least two connectors, each one being aimed at being inserted onto the end of a segment of the handrail, these connectors being cylindrically shaped and co-operating with each other through contact surfaces extending in a plane oriented at 45° with respect to the longitudinal axis of these connectors. These connectors are integral through connections capable of authorizing their rotation at the level of the contact surfaces. These connections are defined by a screw substantially forming the axis of rotation of the two connectors, such connections immobilizing in rotation these connectors provided for so as to be capable of being accessible through an opening ending at the level of the outer periphery of one of these connectors.

11 Claims, 1 Drawing Sheet

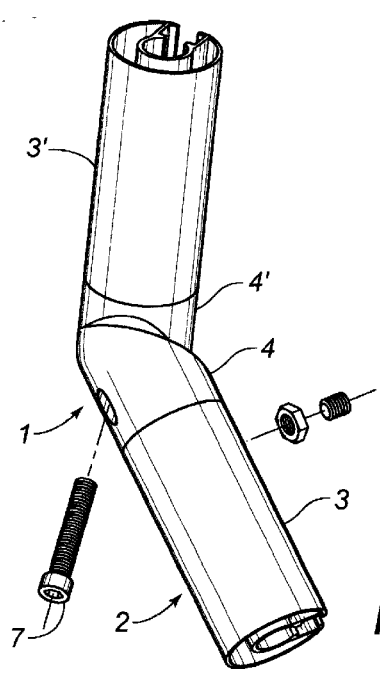
FIG. 1
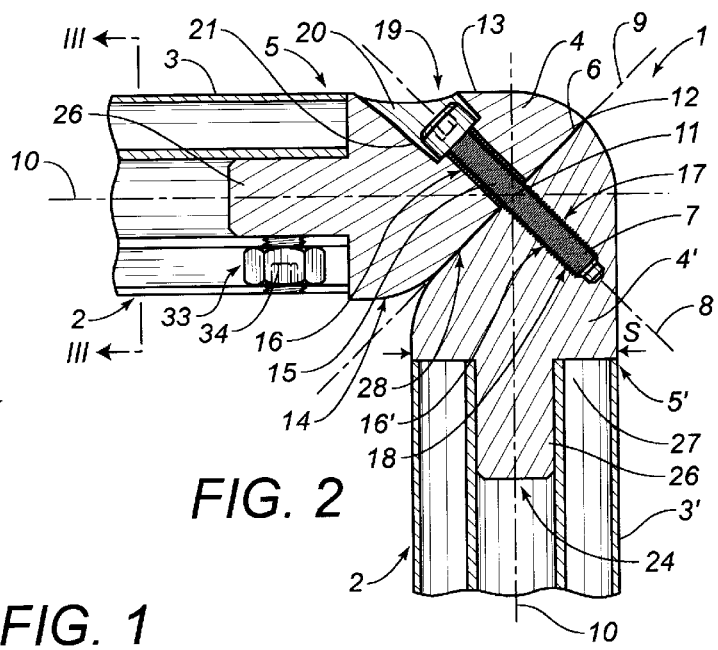
FIG. 2
FIG. 4
FIG. 3
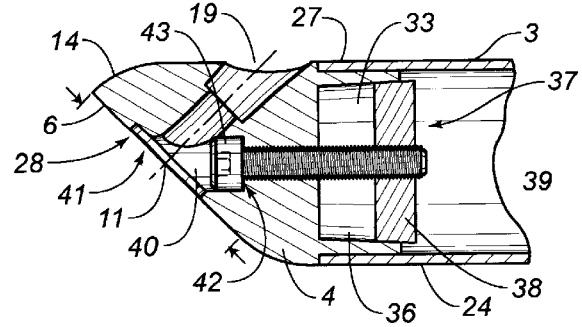
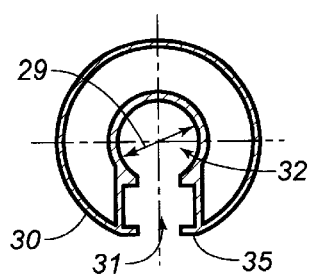
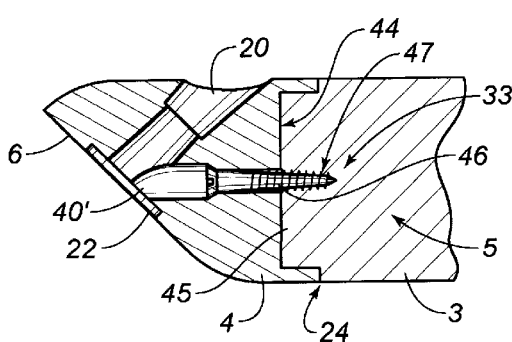
FIG. 5
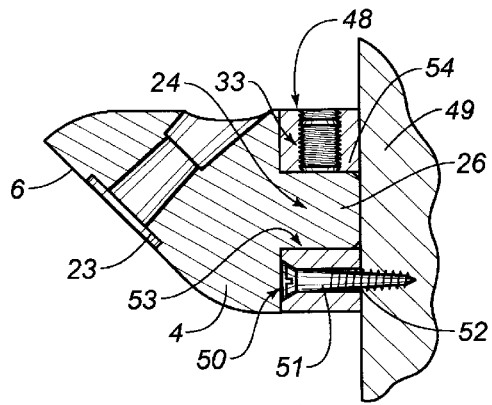
FIG. 6

JOINING DEVICE FOR HAND-RAIL

BACKGROUND OF THE INVENTION

(1) Field of the Invention

The invention relates to a joining device for a handrail comprising at least two connectors, each one insertable onto the end of a segment of the handrail. These connectors cooperate with each other through contact surfaces and are made integral through connecting means capable of authorizing their rotation at the level of these contact surfaces.

This invention relates to the field of manufacturing of handrails for stairs or for any other kind of parapets.

(2) Description of the Prior Art

Stairs are in the form of one or several flights along which runs a handrail. By grasping this handrail, the person who uses stairs is assisted while going upstairs. The handrail provides a surface on which one can lean while going downstairs.

Such a handrail is generally subdivided into as many segments as there are flights. These segments are usually in the shape of tubular elements that are united to each other so as to bring about the continuity of handrail.

From EP-0,688,920 there is already known a joining device for creating the continuity between two tubular segments of a handrail. This joining device includes two connectors in the shape of two half spheres made integral with each other through connecting means allowing them to pivot with respect to each other. This creates a certain angle between the two segments of the handrail.

These two half spheres are kept into contact through their flat contact surface and are provided with integrated or inserted fitting means which allow them to be inserted onto or into the ends of tubular segments forming handrail. After adjusting the angular position of these fitting means, they are fixed to the ends of tubular segments of the handrail by means of a screw passing through the wall of bushing such a joining device interposed between two handrail segments has certain drawbacks.

Thus, this device adopts the shape of sphere the diameter of which is substantially large: than that of tubular segments of the handrail. This results into this handrail having a protrusion which not only hinders the advancing of the user's hand on this handrail, but is of aesthetically unpleasing appearance.

It should also be observed that the connecting means between the two half spheres allow a free rotation of these half spheres with respect to each other. Though such a rotation facilitates the mounting and positioning of the handrail, it also results in a certain lack of rigidity and stability.

In addition, the connection between the joining device and the handrail segments occurs through fitting means which can have protruding parts that are likely to cause injuries. This is also the case when this connection has to be fixed at an angle by using parts which are likely to protrude out of their receiving holes and which may have sharp angles and/or sharp segments.

There is also known a joining device for a handrail that is in the shape of two substantially cylindrical connectors connected each to a handrail segment. Each connector has a longitudinal axis and includes a contact surface oriented at 45°. This surface is provided with a perpendicular bore receiving a stud capable of ensuring the connection between both connectors of the joining device.

Each connector is provided along the longitudinal axis with a through bore into which a fixing organ of a handrail segment is screwed. This hole is also receives a tightening screw capable of co-operating with stud to immobilize this the stud with respect to its connector.

This tightening screw is located at the rear of fixing organ and is accessible only prior to the positioning or upon the withdrawal of this fixing organ. This results in the positioning or angular adjustment of a connector with respect to the other one being possible only prior to the mounting of the handrail segment or by proceeding to the withdrawal of same.

It should also be observed that the contact surface of each connector is bordered, over half its periphery, by a rim that substantially limits the rotation and the angular positioning of a connector. Therefore, when an angle has to be defined between two handrail segments, there should either be used an intermediate part interposed between the two connectors of the connecting rod.

SUMMARY OF THE INVENTION

This invention solves the above-mentioned drawbacks through a joining device of a particularly simple design and an easy implementation.

For this purpose, the invention relates to a joining device for a handrail comprising at least two connectors, each one being aimed at being insertable onto the end of a segment of the handrail. These connectors are cylindrically shaped and cooperate with each other through contact surfaces extending in a plane oriented at 45° with respect to the longitudinal axis of these connectors. These connectors are made integral through connecting means capable of authorizing their rotation at the level of these contact surfaces, these contact surfaces being defined so as to have a substantially circular shape the center of which is located on the axis of the rotation of the connecting means. The connecting means are defined by a screw substantially forming the axis of rotation of the two connectors. This connecting means in addition forms means for immobilizing these connectors in rotation and are capable of being accessible through an opening ending at the outer periphery of one of these connectors.

The advantages resulting from this invention allows the joining between two handrail segments of stairs through cylindrical connectors capable of adopting a rotary notion with respect to each other. The cross-section of these connectors can be chosen so that it is substantially identical to that of the generally tubular segments of the handrail.

Thus, this invention will be particularly applicable to a handrail comprised of tubular profiles with a substantially cylindrical cross-section. This handrail can then have an invariable cross-section over its entire length allowing the user to advance along same without being hindered by any protrusion it should in addition be observed that the absence of this protrusion confers to the handrail a continuity that advantageously contributes to its aesthetically pleasing appearance.

The particularly artful design of these connectors eliminates any sharp angle, on the one hand, between connectors and, on the other hand, between these connectors and the segments of the handrail.

In addition, the connecting means between two connectors also form means for immobilizing the connectors in rotation with respect to each other. Because of such connecting means, it is then possible to confer a determined angle to two successive handrail segments and to angularly fix the handrail segments in this position by immobilizing the connectors in rotation with respect to each other. This results in a substantial increase in rigidity and stability of the handrail.

The invention will be better understood when reading the following description with reference to the attached drawing.

BRIEF DESCRIPTION OF THE DRAWINGS

FIG. 1 is a schematical view of the joining device comprised of two connectors and connecting two successive segments of a handrail, FIG. 2 is a schematical and side cross-sectional view of a joining device the connectors of which are connected, through fitting means, to handrail segments formed of a tubular-type profile, FIG. 3 is a schematical and transversal cross sectional view of tubular profile (across lines 3—3 of FIG. 2), FIG. 4 is a schematical and cross-sectional side view of a connector including fitting means corresponding to a second embodiment, FIG. 5 is a cross-sectional side view similar to the preceding one and corresponds to another embodiment of fitting means, FIG. 6 is a cross-sectional side view similar to the preceding one, corresponding to a connector for being inserted onto a substantially flat surface a wall.

DESCRIPTION OF THE PREFERRED EMBODIMENTS

This invention relates to a joining device 1 for a handrail 2 which is comprised of at least two successive segments 3, 3' each running along a flight of stairs.

Thus, such a handrail 2 may be formed of profiles of the tubular type. In this respect, though, in the embodiments shown in the figures of the attached drawing, the joining device 1 is positioned within the framework of a handrail 2 with a circular cross-section.

This joining device 1 also ensures the connection between two segments of a handrail with a different, parallelepipedic cross-section.

Such joining device 1 comprises at least two connectors 4, 4' each insertable onto one of the ends 5, 5', respectively, of a segment 3, 3' of handrail 2. These connectors 4, 4' are each provided with a contact surface 6 through which they co-operate with each other. They are in addition connected to each other through connecting means 7 allowing their rotation about an axis of rotation 8. According to the invention, a connector 4, 4' has a cylindrical shape, while its contact surface 6 extends in a plane 9 oriented at 45° with respect to the longitudinal axis 10 of this cylindrical connector 4, 4'. In addition, according to the invention, contact surface 6 is defined so as to have a circular shape the center 11 of which is located on the axis of 5 rotation 8.

When assembling the connectors 4,4', the substantially circular shape of their contact surface 6 allows a complete overlapping of these connectors at the union 12 of these connectors 4, 4'. In this respect, it should be observed that the diameter of a contact surface 6 may be defined so as to be equal or even smaller than the cross-section 5 of a connector 4, 4'.

Thus, as can be seen in particular in the various figures, a connector 4, 4' has an outer periphery 13 the surroundings 14 of which in the direction of the contact surface 6 have a rounded shape.

As a matter of fact, such a configuration allows, when assembling two connectors 4, 4', to avoid any protruding edge or sharp angle at the union 12. This results in, on the one hand, a protection of the user against eventual injuries and, on the other hand, an aesthetically pleasing continuity of the handrail 2.

Both connectors 4, 4' of the joining device 1 are connected, as already stated above, through connecting means 7. In this respect, according to the invention, these connecting means 7 are defined by a screw 15 substantially forming the axis of rotation 8 of both connectors 4, 4' with respect to each other. In particular, at least one of the connectors 4 includes a through hole 16 extending perpendicularly to the plane of the contact surface 6, at the center 11 of this contact surface. Accordingly, the axis of this hole 16 and the axis of rotation 8 coincide.

As to the other connector 4', it also includes such a hole 16' that is arranged in a similar way, but, in this case, may be a through hole or not in particular, the threaded shank 17 of the screw 15 passing straight through the hole 16 of the connector 4 may, as the case may be, co-operate with an inner thread 18 provided for in the non-through hole 16' of the connector 4'. This threaded shank 17 of the screw 15 may also protrude from the through hole 16' of connector 16', so as to co-operate with a nut (not shown).

At this point, it should be stated that the above-mentioned inner thread 18 may indeed be directly machined in the non-through hole 16', but it is also conceivable to install in this hole 16' a nut in the shape of an insert including the tapped hole for receiving the screw is. Preferably, the through hole 16, and eventually 16', includes, at its end 19 ending at the outer periphery 13 of a connector 4, 4', a facing 20 for receiving the head 21 of the screw 15 or a nut (solution corresponding to the case in which the hole 16' of the connector 4' is also a through hole).

This joining device 1 advantageously includes, in addition, a means for centering the connectors 4, 4' at the contact surface 6. According to a preferred embodiment, these centering means are defined, on the one hand, at the connector 4 by a circular countersink 23 coaxial to the hole 16 at the contact surface 6 and, on the other hand, by a centering stud of a conjugated shape accordingly arranged at the contact surface 6 of the other connector 4'.

According to another preferred embodiment, each of these connectors 4, 4' may have, at the contact surface 6, a similar circular countersink for receiving a centering ring.

As results from the preceding description, the connecting means 7 connecting two connectors 4, 4' in 5 addition form means for immobilizing these connectors 4, 4' in rotation. Thus, once the angular position of these connectors 4, 4' with respect to the segments 3, 3' of the handrail 2 has been adjusted, the operator may ensure the tightening of the screw 15, which allows to impart to the whole a perfect rigidity and, therefore, a better mechanical strength of the handrail 2.

These connectors 4, 4' of the joining device 1 also include means 24 for connecting integral with the end 5, 5' of a segment 3, 3' of the handrail 2.

As shown in the FIGS. 2 and 4 to 6, such means 24 preferably adopt the shape of fitting means. According to a first embodiment shown in FIG. 2, means 24 are formed by a stud 26 that is provided on the end 27 opposite the one 28 provided with the contact surface 6 of a connector 4, 4'. The cross section of this stud 26 is, in this case, preferably adjusted to the inner section 29 of a tubularly shaped profile defining a segment 3, 3' of the handrail 2. However, with a view to allowing such a connector 4, 4' to freely rotate with respect to a segment 3, 3' of the handrail 2, this stud 26 has a cylindrical shape and is arranged in the axial extension 27 of a connector 4, 4'.

In FIG. 3 shows a cross-sectional view of a profile 30 of a handrail 2 with a substantially circular cross-section. At the level of this profile 30 is defined a longitudinal groove 3' in the shape of a key hole including on the inner side a semicylindrical portion 32 arranged coaxial to profile 30. The stud 26 is preferably accommodated in this semicylindrical portion 32.

It should be noticed that such interlocking means 24 may also include fixing means 33 for fixing the connection between a connector 4, 4' and a segment 3, 3' of the handrail 2. Thus, in the second embodiment which has just been described above, such fixing means 33 may advantageously be in the shape of a nut-screw system 34 positioning itself in the groove 3', between the semicylindrical portion 32 of this groove and the outer periphery 35 of the profile 30.

According to another embodiment, the stud 26 may be truncated in order to allow an insertion under pressure into the tubular profile defining a Segment 3, 3' of the handrail 21 such a stud 26 then forming on itself fixing means 33.

In FIG. 4 shows another embodiment in which interlocking means 24, in the shape of fitting means, are defined, at the end 27 of the connector 4, 4', in the shape of a bushing 36. This bushing 36 is adjusted to the inner cross-section 29 of the profile defining a segment 3, 3' of a handrail 2 and the means 24 so configured include fixing means 33. This fixing means 33 is substantially defined, on the one hand, by an axially split bushing 36 and, on the other hand, by means 37 for radially expanding bushing 36. The radial expansion means 37 are, according to a preferred embodiment, in the shape of a wedge 38 capable of being pushed back inside the bushing 36 and of exerting a radial pressure onto this bushing 36, this under the action of a screw 39 passing through a hole 40 provided for in the axial direction in the connector 4, 4'. Here too, this hole 40 includes, at its end 41 ending at the contact surface 6 a facing 42 for receiving the screw head 43.

According to another embodiment of the means 24 for making a connector 4, 4' integral with the end 5, 5' of a segment 3, 3' of the handrail 2, connector 4, 4' includes, at its end 27, a circular recess 44 for receiving a stud 45 with an adjusted shape that is provided for on the end 5, 5' of segment 3, 3' of the handrail 2. The fixing means 33 may be in the shape of a close fit between the recess 44 and the stud 45.

However, as shown in FIG. 5, these fixing means 33 may also be formed by a fixing screw 46 passing through an axial hole 40' provided for in the connector 4, 4', screw 46 the threaded portion 47 of which co-operates with end 5, 5' of a segment 3, 3' of the handrail 2.

Within the framework of the interlocking means 24 in the shape of a stud 26, it should be noticed that the fixing means 33 may also adopt the simplified configuration of any tightening screw capable of cooperating simultaneously with the stud 26 and the profile defining a segment 3, 3' of the handrail 2.

As shown in FIG. 6, the joining device 1 according to the invention may advantageously be completed with a fixing base 48 which allows one of the connectors 4, 49 to be inserted onto a substantially flat surface 49, a wall.

According to a preferred embodiment, this fixing base 48 includes, on the one hand, means So allowing to fix it to flat surface 49. As a matter of fact, such fixing means 50 may be in the shape of one or several fixing screws 5' passing through openings 52 that are, as a matter of fact, provided for in this fixing base 48 on the other hand, this fixing base 48 is provided with fitting means 53 complementary to the fixing means defined by the interlocking means 24 provided for on one of these connectors 4, 4', at its end 27, and with which they co-operate. By way of an example, within the framework of interlocking means 24 in the shape of a stud 26, the fixing bass 48 includes a recess 54 for receiving this stud 26. Here too, there can be provided fixing means 33 in the shape of a screw or the like capable of making the connector 4, 4' securely affixed with fixing base 48.

According to a preferred embodiment, this fixing base 48 in addition advantageously has a circular cross-section adjusted to the cylindrical shape of such a connector 4, 4'.

As results from the preceding description, the joining device 1 is capable of immobilizing segments 3, 3' of the handrail 2 with an angle between them varying between 0 and 90°. However, it is also possible by fixing two joining devices 1 and to end, of allowing an orientation varying between 0 and 180° of two successive segments 3, 3' of the handrail 2. In this respect, though it is possible to fix two joining devices 1 end to end by means of a short segment of the handrail 2, it can also be contemplated, according to an advantageous embodiment of this invention, to provide a connector 4 of such a joining device 1 with male-type interlocking means 24, whereas the other connector 4' is, in turn, provided with interlocking means 24 of a conjugated shape, in the shape of female-type fitting means, which thus allow to fit and to end several joining devices 1 according to the invention.

Accordingly, it can be seen that, through a very simple design, the joining device 1 according to the invention advantageously solves the problem set forth in the introductory part of this description. Thus, such a joining device 1 is capable not only of ensuring a certain continuity, without any protrusion from the handrail, but also of contributing to the rigidity of this handrail.

What is claimed:

1. A handrail joining device comprising:
   a first handrail segment having a cross-sectional area extending transverse to a length of said first handrail segment;
   a second handrail segment having a cross-sectional area extending transverse to a length of said second handrail segment;
   a first connector inserted into an end of said first handrail segment, said first connector having a contact surface extending in a plane oriented at 45° with respect to a longitudinal axis of said first connector, said first connector having a largest cross-sectional area transverse to said longitudinal axis not more than said cross-sectional area of said first handrail segment;
   a second connector inserted into an end of said second handrail segment, said second connector having a contact surface extending in a plane oriented at 45° with respect to a longitudinal axis of said second connector, each of said first and second connectors being cylindrically shaped, said first connector cooperative with said second connector at said respective contact surfaces thereof, said second connector having a largest cross-sectional area transverse to said longitudinal axis of said second connector not more than said cross-sectional area of said second handrail segment; and
   connecting means for rotatably connecting said first and second connectors together at an axis of rotation such that said respective contact surfaces are in surface-to-surface relationship, each of said contact surfaces having a substantially circular shape with a center located on said axis of rotation, said connecting means comprising a screw defining said axis of rotation, said connecting means for immobilizing rotation of said first connector with respect to said second connector, said screw being accessible through an opening formed on an outer periphery of one of said first and second connectors.

2. The device of claim 1, said first and second connectors having a rounded shape.

3. The device of claim 1, at least one of said first and second connectors having a through hole extending perpendicular to the contact surface at said center, said screw extending into said through hole, said screw having a threaded shaft, another of said first and second connectors having a hole aligned with said through hole and receiving said threaded shaft.

4. The device of claim 3, said through hole having an end opening at said outer periphery, said hole having a facing receiving a head of said screw.

5. The device of claim 1, said contact surface of said first connector being centered with respect to said contact surface of said second connector.

6. The device of claim 1, said first connector having fitting means thereon for securely affixing the connector to said first handrail segment.

7. The device of claim 6, said fitting means comprising:
a stud affixed to an end of said first connector opposite the contract surface, said stud being cylindrically shaped and aligned with the longitudinal axis of said first connector, said stud having a cross-section mateable with an inner cross-section of said first handrail segment.

8. The device of claim 6, said fitting means comprising:
a bushing affixed to an end of said first connector opposite the contact surface, said bushing having a shape mateable with an inner cross-section of said first handrail segment, said bushing being axially split and having means for radially expanding said bushing.

9. The device of claim 6, said fitting means comprising:
a circular recess formed at an end of said first connector opposite the contact surface, said circular recess mateable with a stud extending from said first handrail segment.

10. The device of claim 9, said fitting means further comprising:
a fixing screw extending through an axial hole in said first connector, said screw having a threaded portion engageable with the stud of said first handrail segment.

11. The device of claim 1, further comprising:
a fixing base adapted for attachment to a flat surface; and
a fitting element connected to said first connector and complementarily received by said fixing base.

* * * * *